United States Patent Office 3,657,145
Patented Apr. 18, 1972

3,657,145
DEMULSIFICATION WITH LINEAR POLYMERIC PHOSPHORUS-CONTAINING ESTERS
Franklin E. Mange and Rudolf S. Buriks, St. Louis, and Patrick M. Quinlan, Webster Groves, Mo., assignors to Petrolite Corporation, Wilmington, Del.
No Drawing. Original application Dec. 1, 1967, Ser. No. 687,127, now Patent No. 3,578,731. Divided and this application June 5, 1970, Ser. No. 43,973
Int. Cl. B01d 17/04
U.S. Cl. 252—345
6 Claims

ABSTRACT OF THE DISCLOSURE

Linear polyesters of a phosphorus-containing acid and a diol as illustrated by a polyester having repetitive units of the formula:

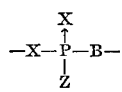

where X is oxygen or sulfur; B is a diol residue; Z is hydrogen in the case of a phosphite ester i.e. H; a hydrocarbon or a substituted hydrocarbon group in the case of a phosphonate ester i.e. R; an oxyhydrocarbon or a substituted oxyhydrocarbon group in the case of a phosphate ester i.e. —OR; a thiohydrocarbon or a substituted thiohydrocarbon group in the case of a thiophosphate ester i.e. —SR.

The preferred polyester has repeating units of the formula

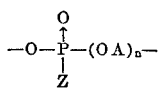

where OA is the residue of an alkylene oxide or a substituted alkylene oxide; $n$ is an integer, for example 1–300 or more, such as about 2–250, for example about 3–200, but advantageously about 5–130, and Z is hydrogen, a substituted group (R), for example, alkyl, aryl, cycloalkyl, alkaryl, aralkyl, heterocyclic, including substituted derivatives thereof, etc.; alkoxy or aryloxy group (OR) for example methoxy, propoxy, isopropoxy, 2-ethylhexoy, etc., phenoxy, etc.

The polyesters are employed as demulsifiers as well as for other uses.

---

This application is a division of application Ser. No. 687,127, filed on Dec. 1, 1967, now U.S. Patent No. 3,578,731.

This invention relates to linear polyesters of a phosphorus-containing acid and a diol as illustrated by a polyester having repetitve units of the formula:

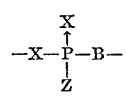

where X is oxygen or sulfur; B is a diol residue; Z is hydrogen in the case of a phosphite ester, i.e. H, a hydrocarbon or a substituted hydrocarbon group in the case of a phosphonate ester i.e. R, an oxyhydrocarbon or a substituted oxyhydrocarbon group in the case of a phosphate ester i.e.—OR; a thiohydrocarbon or a substituted thiohydrocarbon group in the case of a thiophosphate ester i.e. —SR.

The preferred polyester has repeating units of the formula

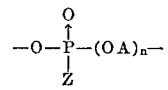

where OA is the residue of an alkylene oxide or a substituted alkylene oxide; $n$ is an integer for example 1–300 or more, such as about 2–250, for example about 3–200, but advantageously about 5–130; and Z is hydrogen, a substituted group (R), for example, alkyl, aryl, cycloalkyl, aryl, aralkyl, heterocyclic, including substituted derivative thereof, etc.; alkoxy or aryloxy group (OR) for example methoxy, propoxy, isopropoxy, 2-ethylhexoxy, etc. phenoxy, etc.

This invention relates to the uses of these polyesters as demulsifiers as well as for other uses.

The polyester are prepared by reacting diols with bifunctional phosphorus-containing acids or derivatives thereof which are capable of yielding linear polyesters. These reactions are illustrated by the following equations:

Preparation A

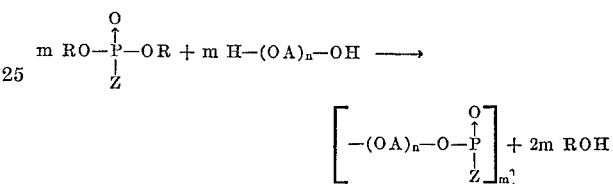

Preparation B

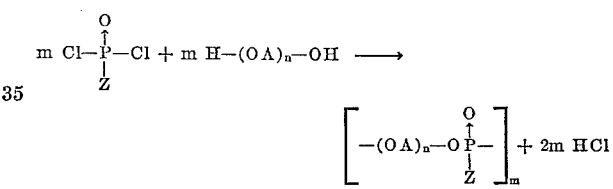

The bifunctional phosphorus-containing acid moieties are derived for example from phosphoric acids, phosphorous acids, phosphonic acids, etc., or their equivalents such as halides, esters, or anhydrides of these acids, and the glycol moieties are derived from any suitable diol although polyoxyalkylene glycols are the preferred embodiment.

The preferred glycols employed in this invention are of the general formula $H(OA)_nH$ where A is an alkylene group for example ethylene, propylene, butylene, etc. (where A is straight chain or branched) and $n$ is 1 to 300 or more. The OA units may be homo-, hetero, or block, or may contain all of these types within one molecule. They are preferably formed from $\alpha,\beta$-alkylene oxides such as ethylene oxide, propylene oxide, butylene oxide, etc. These glycols may be looked upon as oxyalkylated water—

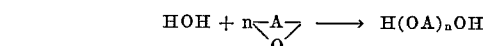

Included within the scope of this invention are any oxyalkylatable compounds capable of reacting with an $\alpha,\beta$-alkylene oxide to form a diol, i.e. having two OH groups $$B[(OA)_nOH]_2$$

Thus the above formula may be expressed in the case of block polymers as follows:

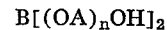

where B is any compound which when oxyalkylated yields a diol and OX′, OY′ and OZ′ each represent different OA units i.e. different alkylene oxide units employed in oxyalkylation for example ethylene oxide of $a$ units, propylene oxide of $b$ units, butylene oxide of $c$ units, etc.

Non-limiting examples of B are ammonia, amines for example $RNH_2$, dicarboxylic acids for example $$R-(COOH)_2$$

Bis-phenols for example

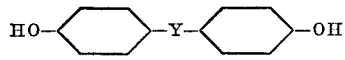

where Y is O, S, alkylene, amino, etc.

Glycols of this general type are commercially available from most major chemical companies, for example those glycols described in Wyandotte's Techniacl Data Sheets under the trade name "Fluronic"; the glycols supplied by Dow Chemical Company in the "Polyglycol E" and "Polyglycol P" series and also under the trade name "Voranol"; the glycols available from Union Carbide as "Carbowaxes" and in the "Niax" series, etc.

The following glycols are mentioned for purposes of illustration and not of limitation as exemplary of this type.

"pluronic" glycols of the formula: $HO(EtO)_X(PrO)_Y(EtO)_XH$

|      | Molecular weight $(PrO)_Y$ moiety | Percent EtO in total molecule |
|------|---|---|
| L31  | 950 | 10 |
| L35  | 950 | 50 |
| L42  | 1,200 | 20 |
| L43  | 1,200 | 30 |

Simple lower molecular weight glycols such as diethylene glycol, triethylene glycol, tetraethylene glycol, dipropylene glycol, tripropylene glycol, tetrapropylene glycol, etc.; and higher molecular weight commercially available polygloycols such as polypropylene glycol of molecular weight 425 and 1025. Other glycols of analogous structures can be readily prepared by well known methods by carrying out the appropriate base catalyzed oxyalkylation of suitable starting materials with the desired alkylene oxides or mixtures of alkylene oxides, or sequences of alkylene oxides. For purposes of illustration and not of limitation, the following glycols are presented as representative materials, prepared by the oxyalkylation at 100–150° C. of dipropylene glycol, using KOH as the catalyst, with certain weights of propylene and/or ethylene oxide:

TABLE I
Diols (weight ratios)

| Ex. | Starting material weight of dipropylene glycol | 1st alkylene oxide weight of PrO | 2nd alkylene oxide weight of EtO |
|---|---|---|---|
| 1  | 1 | 23.0 |  |
| 2  | 1 | 23.0 | 4.5 |
| 3  | 1 | 23.0 | 10.9 |
| 4  | 1 | 30.1 |  |
| 5  | 1 | 30.1 | 1.6 |
| 6  | 1 | 30.1 | 3.5 |
| 7  | 1 | 30.1 | 5.5 |
| 8  | 1 | 30.1 | 7.8 |
| 9  | 1 | 30.1 | 13.1 |
| 10 | 1 | 30.1 | 20.7 |
| 11 | 1 | 2.8 | 0.4 |
| 12 | 1 | 2.8 | 1.6 |
| 13 | 1 | 2.8 | 3.8 |
| 14 | 1 | 2.8 | 8.9 |
| 15 | 1 | 6.5 |  |
| 16 | 1 | 6.5 | 1.9 |
| 17 | 1 | 6.5 | 5.0 |
| 18 | 1 | 6.5 | 7.5 |
| 19 | 1 | 6.5 | 11.2 |
| 20 | 1 | 6.5 | 17.5 |
| 21 | 1 | 50 | 5 |
| 22 | 1 | 75 | 5 |
| 23 | 1 | 100 | 5 |
| 24 | 1 | 125 | 5 |

It is understood that a limitless number of other start-materials, when oxyalkylated in the above general manner, will also yield diols of the type that can be used in the preparation of new linear phosphorus-containing polymers.

Examples of the difunctional phosphorus-containing reagents which can be employed in this invention for the preparation of the linear phosphorus-containing polymers are illustrated in Table II.

All of these materials are readily obtained or prepared by methods well known to those skilled in the art. The following table is given to illustrate types of phosphorus-containing materials useful as starting materials for the preparation of our linear phosphorus-containing polymers and the few examples given are not meant to limit us to polymers prepared from these phosphorus-containing materials.

TABLE II
Phosphorus reactants of the formula:

$$\begin{array}{c} O \\ \uparrow \\ Z-P-C \\ | \\ B \end{array}$$

| Ex. | Z | B | C |
|---|---|---|---|
| 1 | φ— | Cl | Cl |
| 2 | tert-Butyl—⟨⟩—O—CH$_2$—CH$_2$O— | Cl | Cl |
| 3 | EtO— | EtO— | H |
| 4 | MeO— | MeO— | H |
| 5 | φ-O— | φ-O— | H |
| 6 | Iso-prop-O— | Cl | Cl |
| 7 | n-nonyl-O— | Cl | Cl |
| 8 | C$_8$H$_{17}$—O— (2-ethyl hexyl—) | Cl | Cl |
| 9 | φ-O— | Cl | Cl |
| 10 | C$_{13}$H$_{27}$—O— | Cl | Cl |
| 11 | Me— | Cl | Cl |
| 12 | Et— | Cl | Cl |
| 13 | φ— | MeO— | MeO— |
| 14 | n-C$_3$H$_7$—O— | Cl | Cl |
| 15 | MeO— | Cl | Cl |
| 16 | C$_4$H$_9$OCH$_2$CH$_2$OCH$_2$CH$_2$O— | Cl | Cl |
| 17 | C$_{12}$H$_{25}$—O— | Cl | Cl |
| 18 | EtO— | EtO— | C$_4$H$_9$ |
| 19 | φ-O— | φ-O— | φ |
| 20 | Me—O— | Me—O— | CH$_3$ |

Analogous sulfur and sulfur-oxygen phosphorus-containing materials can also be employed.

Where phosphorus-containing esters are employed to prepare the linear polyesters, one employs ester exchange conditions, i.e. catalysts, temperatures, etc., which favor the removal of the ROH moiety of the phosphate ester, etc.

Where phosphorus-containing acid halides are employed, one employs conditions whereby the hydrogen halide formed is removed from the reaction mixture such as by physical expulsion from the reaction mixture, by reduced pressure, gas current, etc., or by chemically removing the halogen halides with a basic material such as pyridine, triethylamine, sodium hydroxide, etc.

As an illustration of the preparation of phosphorodichloridates, the following example describes the synthesis of 2-ethyl hexyl phosphoro-dichloridate (Ex. 8, Table II).

EXAMPLE E–1

Preparation of a difunctional phosphorus-reactant

A one liter, three-necker flask equipped with stirrer, thermometer, dropping funnel and ice water bath, was charged with 51.1 g. (⅓ mol) of phosphorus oxychloride (POCl$_3$). Then 43.4 g. (⅓ mol) of 2-ethyl-1-hexanol was added dropwise, with stirring, while the temperature was maintained at about 10° C. by means of the ice water bath. This addition required about one hour, and the mixture was stirred for an additional hour at room temperature. The product, 2-ethylhexyl phosphorodichloridate, was then freed of HCl gas by bubbling nitrogen gas therethrough for one hour at room temperature while maintaining a reduced pressure by means of a water aspirator. It has the following formula:

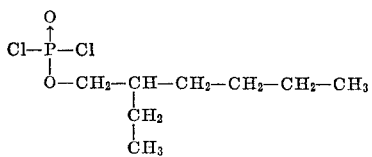

The product obtained in this manner can be used directly without any further purification.

Other phosphorodichloridates can be prepared by this same general procedure by substituting the appropriate alcohol for 2-ethyl-1-hexanol.

To prepare the linear phosphorus-containing polyesters, which are useful as demulsifiers, a variety of methods can be used. The following examples are presented to illustrate some of these synthetic methods.

Example E-2 illustrates the general method for the preparation of linear polymeric phosphate esters from a glycol and a phosphoro-dichloridate according to the equation of Preparation B (Z=alkoxy, etc., as previously defined).

EXAMPLE E-2

Polyester preparation from a phosphorus dihalide with physical removal of halide The glycol was stirred in a vessel while the phosphorodichloridate was added dropwise with vigorous stirring and external cooling until equimolar amounts of each reactant were present in the vessel. The reaction mixture was then stirred under vacuum at room temperature for about one-half hour. Thereupon it was heated under vacuum at 100° C. for about five hours to complete the removal of HCl.

Example E-3 illustrates the general procedure for the preparation of polymeric organophosphates from phosphorodichloridate and glycol in the presence of base according to the equation of Preparation B.

EXAMPLE E-3

Polyester preparation from a phosphorus dihalide with chemical removal of halide The glycol and pyridine (5% molar excess) were dissolved in dry benzene (500 ml./mole of glycol) while an equimolar amount of phosphorodichloridate was added dropwise. The temperature was maintained below 20° C. with external cooling. After stirring for five hours at room temperature the pyridine hydrochloride formed was filtered off and the solvent removed under reduced pressure.

The following example illustrates a general procedure for the preparation of polyphosphite esters by ester exchange according to the equation of Preparation A where Z=H.

EXAMPLE E-4

Polyester prepared by ester exchange

A mixture of the alkylene glycol and the dialkyl or diaryl phosphite, preferably dimethyl, diethyl, or diphenyl phosphite, is heated under an inert, e.g. a nitrogen, atmosphere in a distillation apparatus at such a temperature that the monohydric alcohol or phenol produced in the transesterification is distilled off. The temperature is gradually raised until no more lower alcohol or phenol distils. The transesterification is taken as far as possible by finishing the heating under gradually diminishing pressure. A preferable temperature range for the heating process is from 80°–200° C., but the most suitable temperature depends upon the dialkyl phosphite and the glycol used. If desired, a transesterification catalyst, such as metallic sodium or magnesium, sodium amide, sodium alkoxide or sodium aluminate, and the corresponding potassium or magnesium compounds, may be added to speed up the reaction. Any of the catalysts common to the transesterification art may be used, including acids.

The molecular ratio of the reactants may be varied widely, but a preferable ratio is such that the dialkyl phosphite and the glycol are in the mole ratio of 1:1 to 1:1.5.

Example E-5 illustrates the reaction of an alkyl or aryl-phosphonic dichloride with a diol, to form a linear polymeric phosphorus-containing material according to the equation of Preparation B (Z=phenyl).

EXAMPLE E-5

Polyester prepared with phenyl phosphoryl dichloride

The glycol was stirred in a vessel while the phenyl phosphonic dichloride was added dropwise with vigorous stirring and cooling, until the desired amounts of both reactants were present in the vessel. The reaction mixture was then stirred at room temperature for about one-half hour. This reaction can be carried out according to the procedure of Example E-2 (no base present, HCl removed in vacuo at 100° C.) or according to Example E-3 (pyridine or other base present to remove the HCl generated).

To save repetitious details, examples of some of the linear polyesters prepared according to this invention are summarized in Table III.

It will be obvious to those skilled in the art that the following Table III can be expanded and elaborated upon without limit by changing the diols and the difunctional phosphorus-containing starting materials which are used to prepare these linear polymers. This table is presented to illustrate the general types of linear phosphorus-containing polyesters which are particularly effective as demulsifiers.

TABLE III

[Preparation of linear polymeric phosphorus-containing polymers from difunctional phosphorus reagents and diols]

| Example | Phosphorus reagent, table (example) | Glycol name, table (example) | General procedure according to— |
|---|---|---|---|
| 1 | II, (8) | Triethylene glycol | E-2 |
| 2 | II, (8) | do | E-3 |
| 3 | II, 5 | "PPG 425" | E-4 |
| 4 | II, (14) | Dipropylene glycol | E-3 |
| 5 | II, (8) | "Pluronic" L31 | E-3 |
| 6 | II, (5) | "PPG 1025" | E-4 |
| 7 | II, (5) | "PPG 1200" | E-4 |
| 8 | II, (8) | "Pluronic" L42 | E-3 |
| 9 | II, (14) | "Pluronic" L35 | E-2, E-3 |
| 10 | II, (8) | I, (2) | E-2, E-3 |
| 11 | II, (2) | Dipropylene glycol | E-3 |
| 12 | II, (2) | "PPG 425" | E-2, E-3 |
| 13 | II, (2) | "PPG 1025" | E-3 |
| 14 | II, (10) | Dipropylene glycol | E-4 |
| 15 | II, (8) | "Pluronic" L35 | E-2, E-3 |
| 16 | II, (1) | I, (2) | E-3 |
| 17 | II, (10) | Tripropylene glycol | E-3 |
| 18 | II, (10) | "PPG 1025" | E-3 |
| 19 | II, (19) | I, (17) | E-4 |
| 20 | II, (6) | "Pluronic" L35 | E-2, E-3 |
| 21 | II, (3) | Dipropylene glycol | E-4 |
| 22 | II, (7) | I, (20) | E-3 |
| 23 | II, (1) | "Pluronic" L42 | E-3 |
| 24 | II, (1) | I, (4) | E-2 |
| 25 | II, (1) | I, (2) | E-5 |
| 26 | II, (1) | "PPG 1025" | E-5 |
| 27 | II, (1) | I, (5) | E-3 |
| 28 | II, (1) | Diethylene glycol | E-5 |
| 29 | II, (3) | Diethanolamine | E-4 |
| 30 | II, (1) | I, (6) | E-2, E-3 |
| 31 | II, (1) | I, (9) | E-2, E-3 |
| 32 | II, (1) | I, (10) | E-2, E-3 |
| 33 | II, (1) | "Pluronic" L42 | E-5 |
| 34 | II, (1) | "Pluronic" L35 | E-5 |
| 35 | II, (3) | I, (2) | E-3 |
| 36 | II, (14) | "PPG 425" | E-2, E-3 |
| 37 | II, (3) | "PPG 425" | E-4 |
| 38 | II, (1) | I, (7) | E-3 |
| 39 | II, (12) | I, (19) | E-3 |
| 40 | II, (3) | I, (1) | E-4 |
| 41 | II, (13) | I, (3) | E-4 |
| 42 | II, (5) | I, (2) | E-4 |
| 43 | II, (9) | Tetraethylene glycol | E-3 |
| 44 | II, (13) | Tripropylene glycol | E-4 |
| 45 | II, (3) | I, (2) | E-4 |
| 46 | II, (7) | "PPG 2000" | E-2, E-3 |
| 47 | II, (10) | "PPG 425" | E-2, E-3 |
| 48 | II, (17) | I, (8) | E-3 |
| 49 | II, (3) | "Pluronic" L42 | E-4 |
| 50 | II, (3) | I, (4) | E-4 |

TABLE III—Continued

[Preparation of linear polymeric phosphorus-containing polymers from difunctional phosphorus reagents and diols]

| Example | Phosphorus reagent, table (example) | Glycol name, table (example) | General procedure according to— |
|---|---|---|---|
| 51 | II, (9) | I, (8) | E-3 |
| 52 | II, (9) | I, (14) | E-3 |
| 53 | II, (3) | I, (7) | E-4 |
| 54 | II, (13) | "PPG 1025" | E-4 |
| 55 | II, (10) | I, (12) | E-3 |
| 56 | II, (3) | I, (8) | E-4 |
| 57 | II, (19) | I, (11) | E-4 |
| 58 | II, (4) | Tetramethyl-cyclobutane diol | E-4 |
| 59 | II, (17) | I, (14) | E-3 |
| 60 | II, (13) | I, (3) | E-4 |
| 61 | II, (7) | Triethylene glycol | E-2, E-3 |
| 62 | II, (17) | I, (2) | E-3 |
| 63 | II, (13) | I, (3) | E-4 |
| 64 | II, (10) | I, (2) | E-2, E-3 |

Where two designations are given for the General Procedure, the polyester was prepared by both methods. "PPG" is a polypropylene glycol having the molecular weight of the number adjacent to it.

USE AS WATER-IN-OIL DEMULSIFIERS

This invention also relates to the use of these linear polyesters in preventing, breaking or resolving emulsions of the water-in-oil type, and particularly petroleum emulsions. Their use provides an economical and rapid process for resolving petroleum emulsions of the water-in-oil type that are commonly referred to as "cut oil," "roily oil," "emulsified oil," etc. and which comprise fine droplets of naturally-occurring waters or brines dispersed in a more or less permanent state throughout the oil which constitutes the continuous phase of the emulsion.

These novel demulsifying agents also provide an economical and rapid process for breaking and separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts, from pipeline oil (i.e. desalting).

Demulsification, as contemplated in the present application, includes the preventive step of commingling the demulsifier with the hydrocarbon phase. Similarly, such demulsifiers may be mixed, emulsified, suspended, etc. in the aqueous component.

These linear polyesters employed in the treatment of oil field emulsions are used as such, or are preferably diluted with any suitable solvent, for example, aromatic solvents, such as benzene, toluene, xylene, tar acid oil, sulfur dioxide extract obtained in the refining of petroleum, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., are often employed as diluents miscellaneous solvents, such as pine oil, acetone, carbon tetrachloride, etc., can also be employed as diluents. Similarly, the material or materials employed as the demulsifying agent of our process are often admixed with a mixture of the above solvents or other solvents customarily used in connection with the conventional demulsifying agents. The compositions of this invention may be used alone or in admixture with other suitable demulsifying agents.

The linear polyesters of this invention can be employed in solution, in suspension in such solvents as water, etc., in solid form such as in the form of sticks, pellets, chunks, etc., either alone or as a co-solvent solid such as in a solid solution in naphthalene and the like, etc. These sticks may be employed down-hole. Since the compositions of this invention are frequently used in a ratio of 1 to 10,000, or 1 to 20,000, or 1 to 30,000, or even 1 to 40,000, or 1 to 50,000, as in desalting practice, an apparent insolubility in oil is not significant, because said compositions undoubtedly have some solubility within such concentrations.

In practicing our process for resolving petroleum emulsions of the water-in-oil type, a treating agent or demulsifying agent of the kind herein described is brought into contact with or caused to act upon the emulsion to be treated, in any of the various apparatus now generally used to resolve or break petroleum emulsions with a chemical reagent, the above procedure being used alone or in combination with other demulsifying procedures, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e.g. the bottom of the tank, and reintroduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, gas separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil bearing strata, especially if suspended in or dissolved in the acid employed for acidification.

In all cases, it will be apparent from the above description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the desirable water content of the emulsion separates and settles from the mass.

The following is a typical installation.

A reservoir to hold the demulsifier of this invention is placed at the well-head where the effluent liquids leave the well. This reservoir or container, which may vary from about a gallon to 50 gallons or more for convenience, is connected to a proportioning pump which injects the demulsifier drop-wise into the fluids leaving the well. Such chemicalized fluids pass through the flow line into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:10,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:20,000, 1:50,000, or the like. However, with extremely difficult emulsions higher concentrations of demulsifier can be employed.

The linear polyesters of this invention can be employed alone, in solution or in conjunction with other chemical demulsifiers.

In recent years pipeline standards for oil have been raised so that an effective demulsifier must not only be able to break oil field emulsions under conventional conditions without sludge, but at the same time it must also yield bright pipeline oil, i.e., pipeline oil that is free from the minute traces of foreign matter, whether suspended water or suspended emulsion droplets due to non-resolvable solids. In addition the water phase should be free of oil so as not to create a disposal problem. Thus it is presently desirable to use a demulsifier that produces absolutely bright, haze-free oil in the top layer, yields little or no interphasial sludge, and has little if any oil in the water phase.

The following demulsification examples are presented for purposes of illustration and not of limitation.

EXAMPLES

The linear polyesters of this invention are superior reagents for resolving water-in-oil emulsions. The method employed for evaluating these materials is the "Bottle Test" described in "Treating Oil Field Emulsions," Second Edition, issued by Petroleum Extension Service and the Texas Education Agency in cooperation with the American Petroleum Institute, 1955 (revised 1962), pages 39–44.

The effectiveness of the present demulsifiers is based on their ability to resolve oil field emulsions with a minimum amount of reagent to yield bright oil that is essentially free of water and unresolved emulsion and meets pipeline specification (normally less than 1% BS & W). Of particular advantage is the ability of the present demulsifiers to break petroleum emulsions very rapidly in comparison with conventional demulsifiers.

In general the demulsifiers are tested as follows:

The demulsifier of a specific concentration is added to 100 ml. of the freshly sampled emulsion, which emulsion is then agitated by giving it the indicated number of shakes. This heated emulsion is then allowed to quietly settle for the indicated period of time at the indicated temperature.

At the end of this settling period the resultant top oil is analyzed for water. Corresponding comparative tests are also run on the best commercial compounds for that particular location.

Following is a series of samples of test results obtained by carring out the "bottle test" in several locations and comparing the effectiveness of our phosphorus-containing polyesters with the best commercial materials.

Test A

Field: Swift Current, Canada
Producer: Mobil Oil of Canada
Lease: Battum #21
Well: No. 5–15
Test at: 160° F.
No. of shakes: 1000
Settling time: 2½ hours

| Example | | Ml. of 2% test solution | Percent water in demulsified oil |
|---|---|---|---|
| 1 | Best commercial compound | 2.5 | 2.0 |
| 2 | Demulsifier from Example 24 | 2.5 | 1.0 |
| 3 | Demulsifier from Example 40 | 2.5 | 0.4 |
| 4 | Demulsifier from Example 42 | 2.5 | 0.7 |
| 5 | Demulsifier from Example 7 | 2.5 | 0.5 |

Test B

Field: Weeks Island, La.
Producer: Shell Oil Co.
Lease: Mylers
Well: No. 5
Test at: 180° F.
No. of shakes: 100
Settling time: 1 hr.

| Example | | Ml. of 2% test solution | Percent water in demulsified oil |
|---|---|---|---|
| 1 | Best commercial compound | 0.3 | 0.8 |
| 2 | Demulsifier from Example 1 | 0.3 | 0.1 |
| 3 | Demulsifier from Example 61 | 0.3 | 0.1 |
| 4 | Demulsifier from Example 23 | 0.3 | 0.5 |
| 5 | Demulsifier from Example 37 | 0.3 | 0.1 |

Test C

Field: Webster, Tex.
Producer: Humble Oil
Lease: Scott
Well: No. 32
Test at ambient temp.
No. of shakes: 150
Settling time: 4 hrs.

| Example | | Ml. of 2% test solution | Percent water in demulsified oil |
|---|---|---|---|
| 1 | Best commercial compound | 0.4 | 0.9 |
| 2 | Demulsifier from Example 15 | 0.4 | 0.8 |
| 3 | Demulsifier from Example 38 | 0.4 | 0.6 |
| 4 | Demulsifier from Example 31 | 0.4 | 0.5 |
| 5 | Demulsifier from Example 18 | 0.4 | 0.4 |
| 6 | Demulsifier from Example 9 | 0.4 | 0.4 |

Test D

Field: Manvel, Tex.
Producer: Texaco, Inc.
Lease: W. T. Belcher
Well: No. 30
Test at ambient temp.
No. of shakes: 200
Settling time: 3 hours

| Example | | Ml. of 2% test solution | Percent water in demulsified oil |
|---|---|---|---|
| 1 | Best commercial compound | 0.4 | 1.7 |
| 2 | Demulsifier from Example 16 | 0.4 | 0.8 |
| 3 | Demulsifier from Example 35 | 0.4 | 0.8 |
| 4 | Demulsifier from Example 37 | 0.4 | 0.8 |
| 5 | Demulsifier from Example 42 | 0.4 | 1.2 |
| 6 | Demulsifier from Example 64 | 0.4 | 0.8 |

Test E

Field: Kern Front, Calif.
Producer: Tide Water Oil
Lease: G and W

Well: Composite
Test at: 180° F.
No. of shakes: 650
Settling time: 5 hours

| Example | | Ml. of 2% test solution | Percent water in demulsified oil |
|---|---|---|---|
| 1 | Best commercial compound | 0.5 | 2.0 |
| 2 | Demulsifier from Example 53 | 0.5 | 1.6 |
| 3 | Demulsifier from Example 56 | 0.5 | 1.6 |
| 4 | Demulsifier from Example 46 | 0.5 | 1.6 |
| 5 | Demulsifier from Example 31 | 0.5 | 1.4 |
| 6 | Demulsifier from Example 33 | 0.5 | 1.4 |

As is quite evident, a wide variety of diols and phosphorus-containing or equivalent acids will be constantly developed which could be useful in this invention. It is, therefore, not only impossible to attempt a comprehensive catalogue of such compositions, but to attempt to describe the invention in its broader aspects in terms of specific chemical names of diols and phosphorus acids used would be too voluminous and unnecessary since one skilled in the art could by following the description of the invention herein select a useful polyester. This invention lies in the reaction of suitable diols with suitable phosphorus-containing acids to yield polyesters suitable as demulsifiers and the individual reactants are important only in the sense that the properties of the resultant polyester can affect this function. To precisely define each specific useful diol and phosphorus-containing acid in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of specific diols and phosphorus-containing acids suitable for this invention by reacting them in the process as set forth herein. In analogy to the case of a machine, wherein the use of certain materials of construction or dimensions of parts would lead to no practical useful result, various materials will be rejected as inapplicable where others would be operative. We can obviously assume that no one will wish to react a useless diol or a useless phosphorus-containing acid nor will be misled because it is possible to misapply the teachings of the present disclosure to do so. Thus, any diol and any bifunctional phosphorus-containing acid can be reacted to yield polyesters that can perform the function stated herein, i.e., can be employed as demulsifiers.

OTHER USES (1) The water soluble and/or water dispersible linear polyesters of this invention can be employed as oil-in-water demulsifiers in the manner described in U.S. Patent 2,964,478.

(2) Because of their demulsification properties, these linear polyesters are also useful in preventing the formation of emulsions such as occurs during transit or storage. Oil may pick up extraneous water during transit through pipelines, storage in tanks and during transportation in sea-going tanks and the like. This oil may be dehydrated, including refined petroleum such as lube oil, kerosene, fuel oil and the like.

(3) They may be employed as corrosion inhibitors of metals, particularly in preventing or inhibiting the corrosion of iron, steel, and ferrous alloys, for example in oil wells which provide corrosion in oil, oil-brine mixtures, water floods, refineries and the like as well as in other systems. These polyesters impart resistance to attack by a variety of corrosive agents such as brines, inorganic acids, organic acids, $CO_2$, $H_2S$, etc.

Other uses include the following:

(4) Biocides, i.e. bactericides, algicides, etc.

(5) Additives for various fuels including gasoline, diesel fuel, jet fuel, etc.

(6) Additives for sludging oil, cutting oil, etc.

(7) Additives for lube oils.

(8) Emulsifiers.

(9) Flocculants or as floc-aids.

(10) Scale inhibitors, particularly in the petroleum industry.

Having thus described our invention what we claim as new and desire to obtain by Letters Patent is:

1. A process of demulsification characterized by treating an emulsion with a linear polyester having repetitive units of the formula

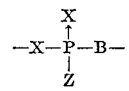

wherein X is oxygen or sulfur; B is

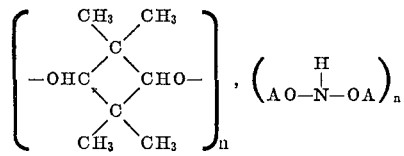

or $(OA)_n$ wherein A is ethylene, propylene or butylene or mixtures thereof and $n$ is 1 to 300, with the proviso that OA units can be homopolymers, heteropolymers or block polymers and A is the same or different; and Z is hydrogen, phenyl,

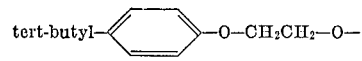

ethoxy, methoxy, phenoxy, iso-propoxy, n-nonyl—O—, 2-ethylhexoxy, $C_{13}H_{27}$—O—, methyl, ethyl,

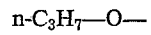

$C_4H_9OCH_2OCH_2CH_2OCH_2CH_2O$—, or $C_{12}H_{25}$—O—.

2. The process of claim 1 wherein each X is oxygen and B is $(OA)_n$.

3. The process of claim 2 wherein $n$ is 2–250 and (OA) is EtO, PrO or a mixture of EtO and PrO.

4. The process of claim 3 wherein OA is PrO.

5. The process of claim 3 wherein OA is a mixture of EtO and PrO.

6. The process of claim 3 wherein OA is EtO.

References Cited
UNITED STATES PATENTS 3,228,998    1/1966    Fierce et al. _____ 260—929 X JOHN D. WELSH, Primary Examiner U.S. Cl. X.R.

252—351